(12) United States Patent
Gothi et al.

(10) Patent No.: US 10,503,823 B2
(45) Date of Patent: Dec. 10, 2019

(54) METHOD AND APPARATUS PROVIDING CONTEXTUAL SUGGESTION IN PLANNING SPREADSHEET

(71) Applicant: SAP SE, Walldorf (DE)

(72) Inventors: Shaileshbhai Gothi, Mumbai (IN); Subhadeep Khan, Anandapur (IN); Gaurav Jain, Bangalore (IN); Rishi Prajapati, Ratlam (IN)

(73) Assignee: SAP SE, Walldorf (DE)

( * ) Notice: Subject to any disclaimer, the term of this patent is extended or adjusted under 35 U.S.C. 154(b) by 577 days.

(21) Appl. No.: 14/935,203

(22) Filed: Nov. 6, 2015

(65) Prior Publication Data
US 2017/0132195 A1  May 11, 2017

(51) Int. Cl.
*G06F 17/24* (2006.01)
(52) U.S. Cl.
CPC .................. *G06F 17/246* (2013.01)
(58) Field of Classification Search
CPC .................................... G06F 17/246
USPC ....................................... 715/212
See application file for complete search history.

(56) References Cited

U.S. PATENT DOCUMENTS

2003/0033288 A1\* 2/2003 Shanahan ........... G06F 17/3064

\* cited by examiner

*Primary Examiner* — Laurie A Ries
(74) *Attorney, Agent, or Firm* — Fountainhead Law Group P.C.

(57) ABSTRACT

Embodiments relate to methods and apparatuses providing contextual suggestion in the environment of a user interface to a planning spreadsheet. Particular embodiments feature an interface engine that is in communication with an underlying data model. The data model may be hierarchical in nature (e.g., organized according to tree structure). In response to user input to the spreadsheet interface, the engine is configured to parse metadata associated with the data model, and construct therefrom suggestion strings prompting a user to interact with the data of the data model. The interface engine may consider a variety of factors in providing relevant suggestion, including but not limited to cell type and user context (e.g., access rights) so as to further target the offered suggestions offered to user expectation. This approach can desirably enhance efficiency of user interaction with the spreadsheet application, resulting in less typing, fewer corrections, faster workflows, and greater satisfaction.

14 Claims, 6 Drawing Sheets

METHOD AND APPARATUS PROVIDING CONTEXTUAL SUGGESTION IN PLANNING SPREADSHEET

BACKGROUND

Unless otherwise indicated herein, the approaches described in this section are not prior art to the claims in this application and are not admitted to be prior art by inclusion in this section.

Embodiments relate to user interfaces for spreadsheet application, and in particular, to methods and apparatuses providing contextual suggestion in planning spreadsheet applications.

Spreadsheet applications have found use for a variety of purposes, including but not limited to analysis, planning, forecasting, conducting Enterprise Performance Management (EPM) related tasks in general, and others.

In such a spreadsheet type of user interface, the data is typically presented in a grid of rectangular layout. The grid is further divided in rows and columns where each data point occupies a cell uniquely identified by the row number and column number.

In interacting with the spreadsheet application, a user may seek to create headers, so as to organize the data according to a corresponding column or row. Conventional interfaces to spreadsheet applications, however, may not afford a user with an intuitive sense of the structure of an underlying data model, and/or the relationship between the data model and the various fields of the matrix.

SUMMARY

Embodiments relate to methods and apparatuses providing contextual suggestion in the environment of a user interface to a planning spreadsheet. Particular embodiments feature an interface engine that is in communication with an underlying data model. The data model may be hierarchical in nature (e.g., organized according to tree structure). In response to user input to the spreadsheet interface, the engine is configured to parse metadata associated with the data model, and construct therefrom suggestion strings prompting a user to interact with the data of the data model. The interface engine may consider a variety of factors in providing relevant suggestion, including but not limited to cell type and user context (e.g., access rights) so as to further target the offered suggestions offered to user expectation. This approach can desirably enhance efficiency of user interaction with the spreadsheet application, resulting in less typing, fewer corrections, faster workflows, and greater satisfaction.

An embodiment of a computer-implemented method comprises an engine receiving a user input to a cell of a spreadsheet, the engine referencing a data model to collect data and metadata relevant to the user input, and the engine parsing the metadata from the data. Based upon the metadata, the engine generates a first suggestion for entry, and the engine communicates the first suggestion to display in the spreadsheet.

A non-transitory computer readable storage medium embodies a computer program for performing a method comprising an engine receiving a user input to a cell of a spreadsheet, the engine referencing a data model to collect data and metadata relevant to the user input. The engine parses the metadata from the data. Based upon the metadata, the engine generates a list of a plurality of suggestions for entry. The engine communicates the plurality of suggestions to display in a drop-down box in the spreadsheet.

An embodiment of a computer system comprises one or more processors and a software program executable on said computer system. The software program is configured to cause an engine to receive a user input to a cell of a spreadsheet, and reference a data model to collect data and metadata relevant to the user input. The software program is further configured to cause the engine to parse the metadata from the data, and, based upon consideration of the metadata and another input, generate a list of a plurality of suggestions for entry. The software program causes the engine to communicate the plurality of suggestions to display in a drop-down box in the spreadsheet.

In certain embodiments the data model exhibits a hierarchy, the metadata further comprises a layer of the hierarchy, and the first suggestion is limited to a perspective within the layer.

In some embodiments the engine further considers context information to generate the first suggestion.

According to particular embodiments the context information is received from a browser.

In various embodiments the context information comprises geolocation or cell type.

In some embodiments the engine further considers at least one of a history, a preference, and an authorization, to generate the first suggestion.

According to particular embodiments the engine further generates a second suggestion, and the engine communicates the first suggestion and the second suggestion for display in a drop down box.

In certain embodiments the engine is further configured to enter the data into the spreadsheet upon selection of the suggestion.

According to various embodiments the data model is stored in an in-memory database, and the suggestion engine comprises an in-memory database engine.

The following detailed description and accompanying drawings provide a better understanding of the nature and advantages of embodiments.

DETAILED DESCRIPTION

Described herein are methods and apparatuses configured to provide contextual suggestion in planning spreadsheet environments. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

Embodiments relate to methods and apparatuses providing contextual suggestion in the environment of a user interface to a planning spreadsheet. Particular embodiments feature an interface engine that is in communication with an underlying data model. The data model may be hierarchical in nature (e.g., organized according to tree structure). In response to user input to the spreadsheet interface, the engine is configured to parse metadata associated with the data model, and construct therefrom suggestion strings prompting a user to interact with the data of the data model. The interface engine may consider a variety of factors in providing relevant suggestion, including but not limited to cell type and user context (e.g., access rights) so as to further target the offered suggestions offered to user expectation. This approach can desirably enhance efficiency of user interaction with the spreadsheet application, resulting in less typing, fewer corrections, faster workflows, and greater satisfaction.

Figure 1:
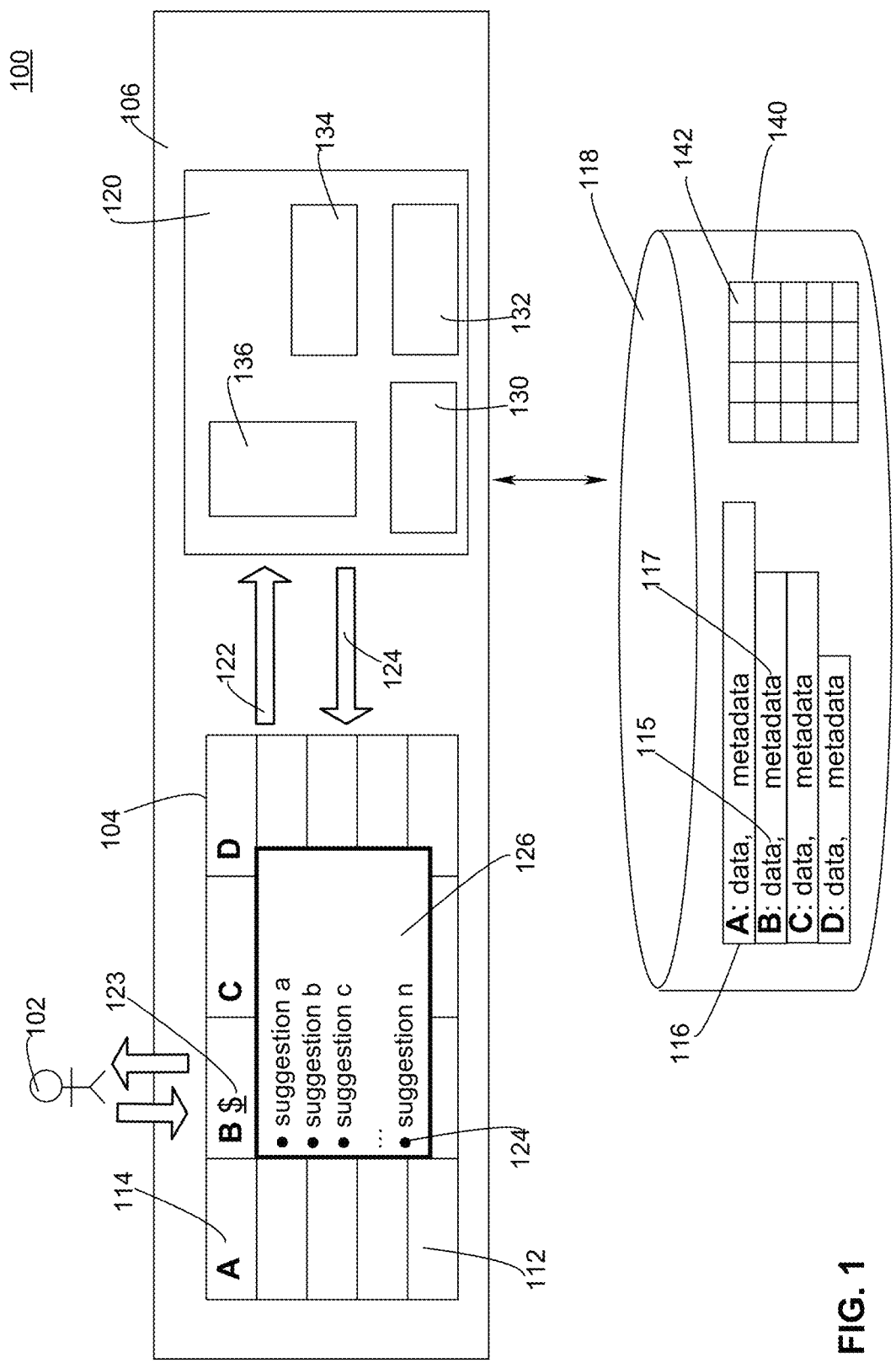
FIG. 1 shows a simplified block diagram of a system according to an embodiment.

FIG. 1 presents a simplified view of a system 100 according to an embodiment. In particular, user 102 interacts with an interface 104 of an application layer 106 to obtain a spreadsheet 108 comprising a plurality of cells 110 defined by rows 112 and columns 114.

Data within the cells of the spreadsheet corresponds to data 115 located within data model 116 stored in an underlying database layer 118. The data model 116 further includes metadata 117 associated with the data.

Specifically, system 100 comprises a data model 102, for example as may be employed for planning purposes. In this data model, various perspectives may be organized in the form of a hierarchical tree 104 of the associated attributes. A used herein, the term 'perspective' can refer to either a dimension or a measure.

For example, if geographic region is considered as a perspective, then a state belongs to a country, and a country belongs to continent (or other significant geographical region) from a business point of view. Similar hierarchies exist for commercial accounts (e.g., divisions, affiliates, subsidiaries) as well as a variety of other user defined perspectives.

The hierarchical tree information may be made available to a spreadsheet application in a variety of ways. For example if spreadsheet data is present on an HTTP server, the hierarchical tree information can be fetched using Representational State Transfer (REST) services.

As indicated above, the data model may exhibit a hierarchical structure. Here the data model comprises various levels, with levels B and C occupying a same relative location within the hierarchy.

A suggestion engine 120 is configured to receive input in the form of user input 122 to the spreadsheet. This input may take the form of typing a string ($) 123 into a particular cell of the spreadsheet.

Implementing particular embodiments may utilize the parsing of metadata of data associated with a data model, followed by construction of suggestion strings from that data. Accordingly, FIG. 1 shows a parsing module 130 that is designed to fulfill this role.

Alternatively or in addition to the receipt of input in the form of metadata parsed from a data model, the suggestion engine may consider other types of information 140 in formulating a list of suggestions. That other information may be stored as data/metadata in fields of an underlying database 142. As described below, that other information can include but is not limited to user/organizational preferences, user/organizational history, and/or access authorizations.

While the particular embodiment of FIG. 1 depicts this other information as being stored in the name non-transitory medium as the data model, this is not required. In alternative embodiments, other information not based upon an underlying data model, may be available via a different storage medium.

In response to this input, the suggestion engine is configured to provide suggestion(s) 124 back to the user to guide further input. As shown in this FIG. 1, the suggestions may be presented for user selection in the spreadsheet in the form of a drop-down box 126.

The interface may exhibit a transient appearance on the spreadsheet, from the time the user starts typing in a relevant cell, until a selection from the list of suggestions is made (or nothing is selected).

The system further includes a context analyzer module 132. Prior to triggering suggestion generation, various possible types of suggestion that are available to the spreadsheet cell for which entry is sought, are determined.

This determination of suggestion type, may involve various analyses. For example, the cell is analyzed to see whether numerical entry is appropriate, or if instead the cell belongs to a header for a certain perspective.

Another analysis may determine the nature of the selected perspective (e.g., geographical region, time, dollar amount, etc.).

Still another analysis may consider a level of privilege access by the user.

Yet another analysis may identify restrictions (if any), that are present for the spreadsheet under consideration. An example of such a restriction could be where the planner (user) is permitted only in a certain time span (say from 2015-2018), with any suggestion lying outside that range being unexpected (and hence not suggested).

FIG. 1 further shows the suggestion generator module 134. Based upon knowledge provided by the context analyzer, a suggestion generation algorithm serves to focus upon the requirement of expected result set.

When user data is available, that user data can be referenced to check similarity with available attributes in the hierarchy tree according to the appropriate perspective. Accordingly, possible suggestions may be prioritized based upon one or more of the following aspects:
  user (planner) profile;
  past interaction (e.g., by the particular planner, that planner's department, and/or others);
  completeness of the workflow;
  position of the suggested attribute in the hierarchy tree;
  planner geolocation and/or time;
  preferences (individual and/or organization-wide).

The final list of suggestions is displayed by the user input/display control module 136. Also, the attributes proximate to suggested attributes may be shown inline, so as to provide more intuitive choices for the user.

Figure 2:
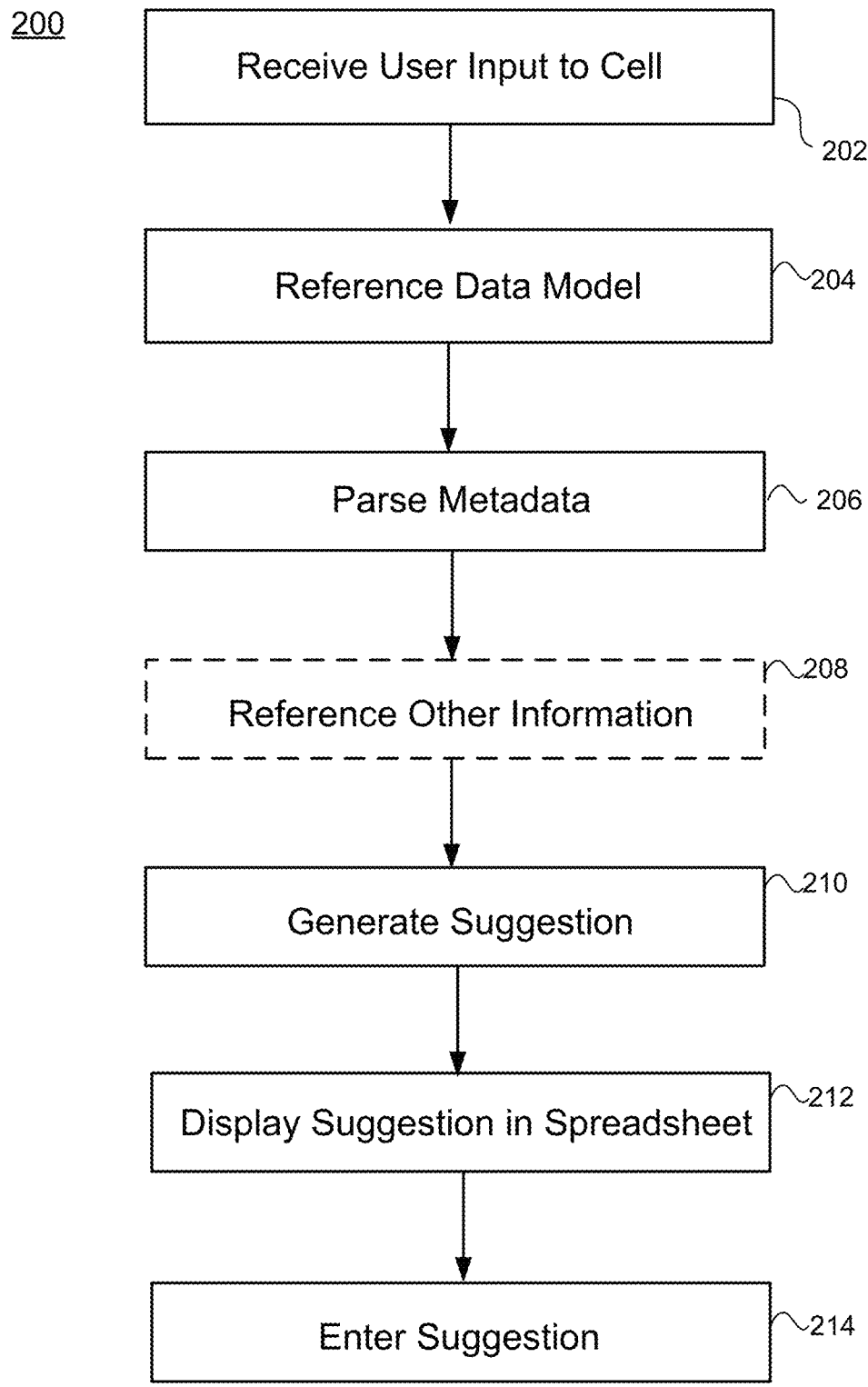
FIG. 2 shows a simplified flow diagram of a method according to an embodiment.

FIG. 2 is a simplified flow diagram showing a method 200 according to an embodiment. In a first step 202 user input to a cell of the spreadsheet, is received by a suggestion engine.

In a second step 204, the suggestion engine references a data model based upon the input.

In a third step 206, the suggestion engine parses from the data model, metadata relevant to the input.

In an optional fourth step 208, the suggestion engine may also receive other information relevant to suggestion generation. Such other information may comprise context information provided by a browser.

In a fifth step 210, based upon the parsed metadata and/or any other information, the suggestion engine generates suggestion(s). In a sixth step 212, the suggestion engine communicates the suggestions to the spreadsheet.

In a seventh step 214, the suggestion engine may receive further input for entry. For example, the suggestion engine may receive indication that the user has in fact selected one of the suggestions for entry.

According to embodiments, interfaces to spreadsheets may implement one or more features that serve to enhance a quality of user interaction. For example the suggestion engine may supplement a spreadsheet with suggestions derived from the underlying data model. This enhances a probability of the suggestion being relevant to the user's interest and ultimately being selected. It also allows more options based upon the data model, to be offered for suggestion.

Also, the capabilities added by embodiments may make planning workflows faster when working with spreadsheets. Embodiments also serve to reject the unrelated information from appearing in suggestions based on the type of the cell.

The use of embodiments may also enhance a quality of user interaction by offering multiple suggestions to a user at a same time (e.g., in a drop-down box). One touch selection is possible, which results in faster workflows.

According to certain embodiments, user input validation is integral to selection of the suggestions. Heuristics may allow better prioritization of the suggestions. Information proximate to a suggested attribute may also be shown, thereby aiding in better cognition of the choice to be made.

A user can start by typing any relevant part of the attribute string, resulting in possible matches being displayed as suggestions. Such an approach contrasts with conventional interfaces relying exclusively upon matching of initial characters.

The sophistication of processing by the suggestion engine may allow for consideration of erroneous user input (such as typographical errors). Again, such rapid recognition may streamline user interaction and enhance satisfaction.

EXAMPLE

Figure 3:
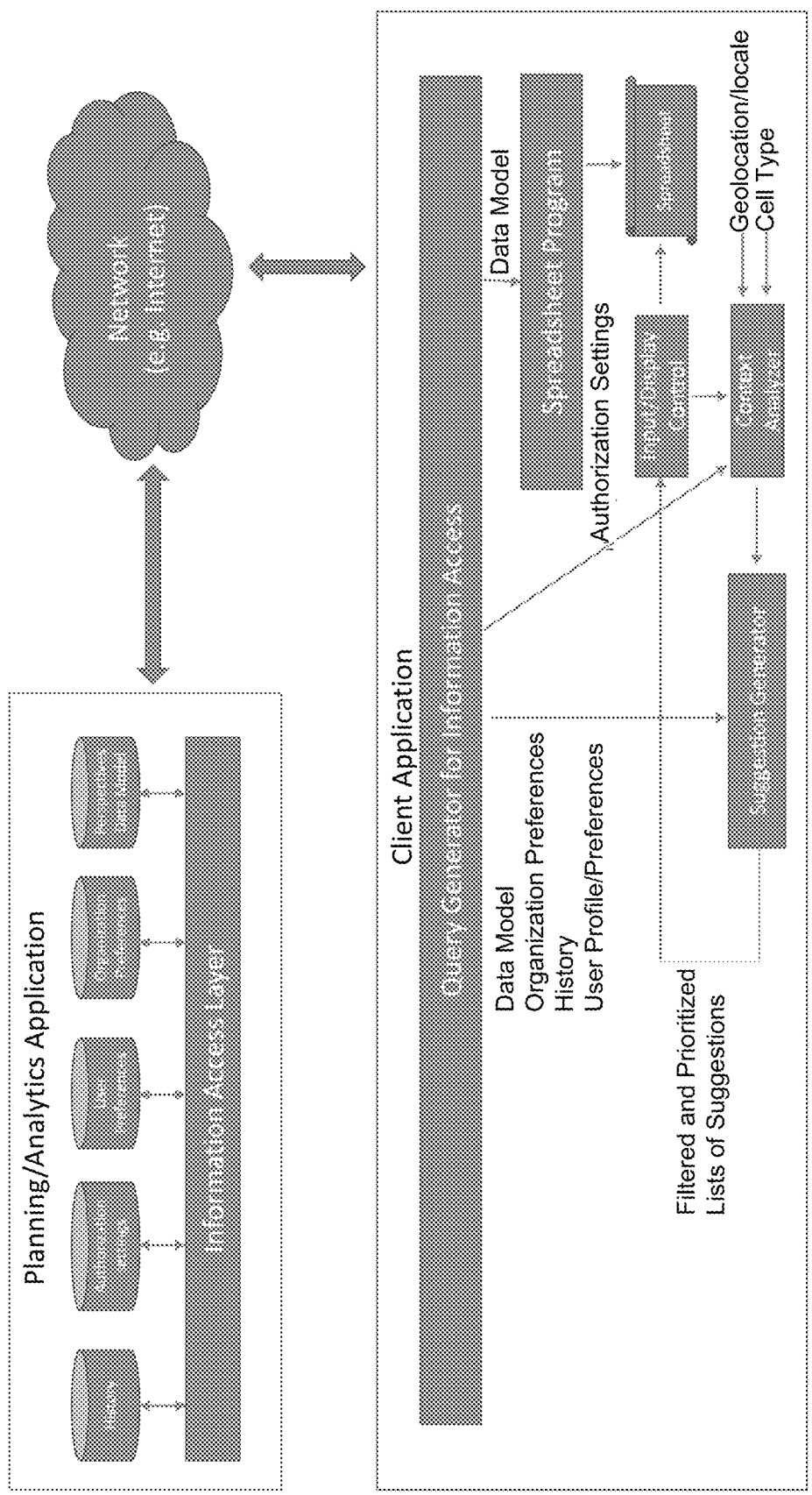
FIG. 3 provides a simplified diagram illustrating a component level view according to an example.

FIG. 3 provides a simplified diagram illustrating a component level view according to an example. Here a client application including the suggestion generator, is in network communication with a planning/analytics application. Examples of such a planning analytics application may include but are not limited to Enterprise Resource Management (ERM), Customer Relationship Management (CRM), Supply Chain Management (SCM), as well as other types of platforms utilized during operations of an enterprise.

Such planning/analytics application(s) store data in the form of structured data objects including both data and metadata relevant thereto. In some embodiments the data/metadata may be stored in a database (e.g., a relational-type database). The database can be an in-memory type database, for example the HANA in-memory database available from SAP SE of Walldorf, Germany.

The suggestion generator component of the client application may provide filtered and prioritized lists of suggestions in response to various types of inputs available to the planning/analytics application. Such inputs can include but are not limited to:
  user and/or organization history (e.g., prior search/database query history);
  authorization/access settings;
  user and/or organization preferences; and
  the underlying data model, including perspectives comprising dimensions or measures.

A context analyzer component of the client application may receive and process various forms of context-related input for use by the suggestion generator in producing filtered and prioritized lists of suggestions. Examples of such contextual input can include but is not limited to:
  authorization/access settings (from the planning/analytics application); and
  geolocation/locale (from a browser); and
  cell type (from a browser).

An input/display control component of the client application may receive the filtered and prioritized lists of suggestions, and determine therefrom the appearance of the spreadsheet, including features such as drop-down boxes and the presentation of various options for user selection.

Figure 4:
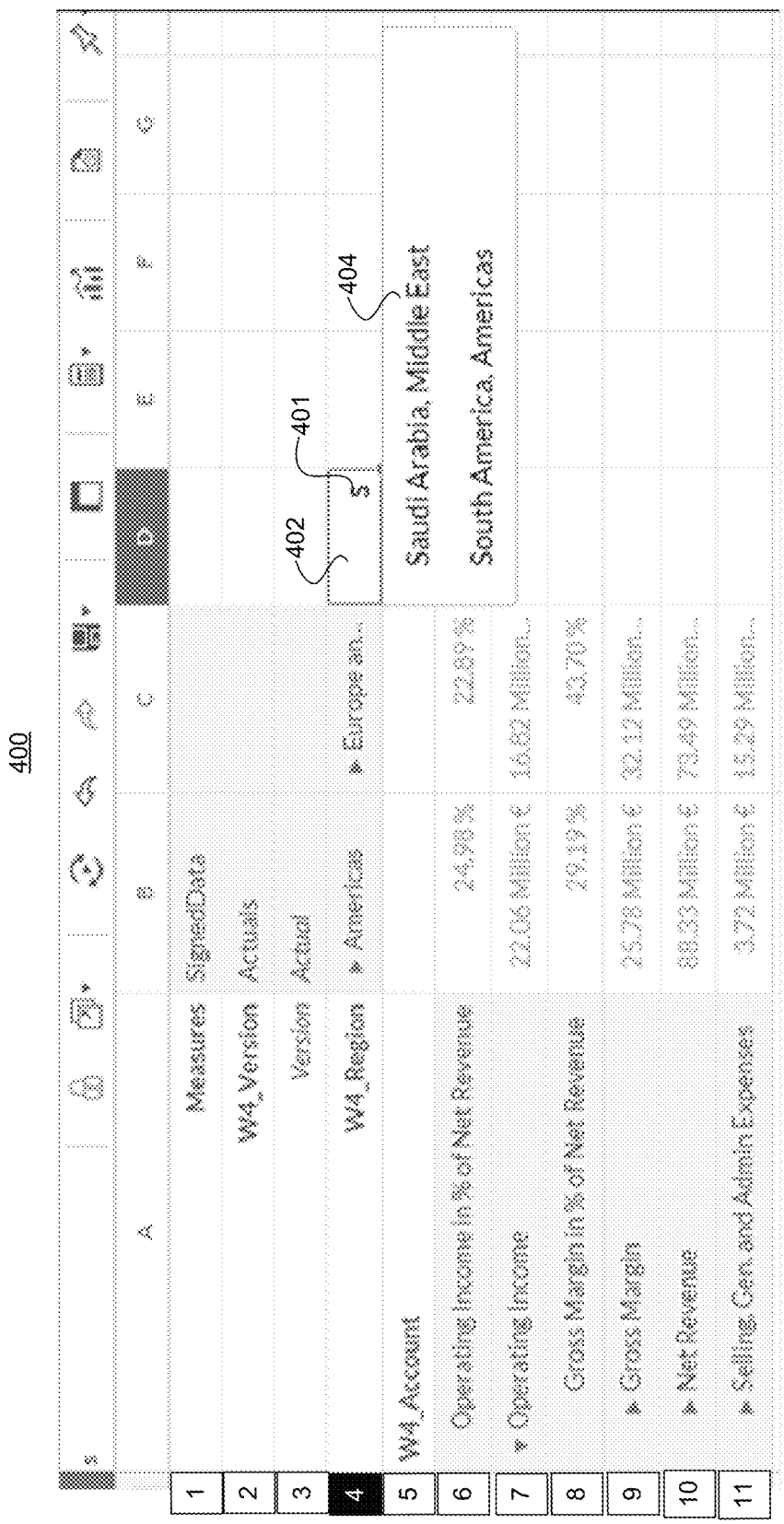
FIG. 4 shows an exemplary screenshot.

FIG. 4 is an example of a spreadsheet screenshot 400 illustrating an embodiment. Here, the user/planner seeks to type the character 'S' 401 into a header cell 402 corresponding to a perspective representing a geographical region. The dropdown box 404 shows the available suggestions provided in response to that input.

Based upon the type of the cell attempting to be populated, and metadata associated therewith in the underlying data model, the interface engine has returned relevant suggestions available for selection by the user. Here, the metadata considered by the interface engine indicates the cell type to be a header relating to a geographic region, and the corresponding suggestions are specific locations ("South America", "Saudi Arabia") within particular geographic regions ("Americas", "Middle East").

While FIG. 1 shows the suggestion engine as part of an application layer overlying a database layer, this is not required. In certain embodiments, the suggestion engine may be implemented by a database engine, such as an in-memory database engine.

Figure 5:
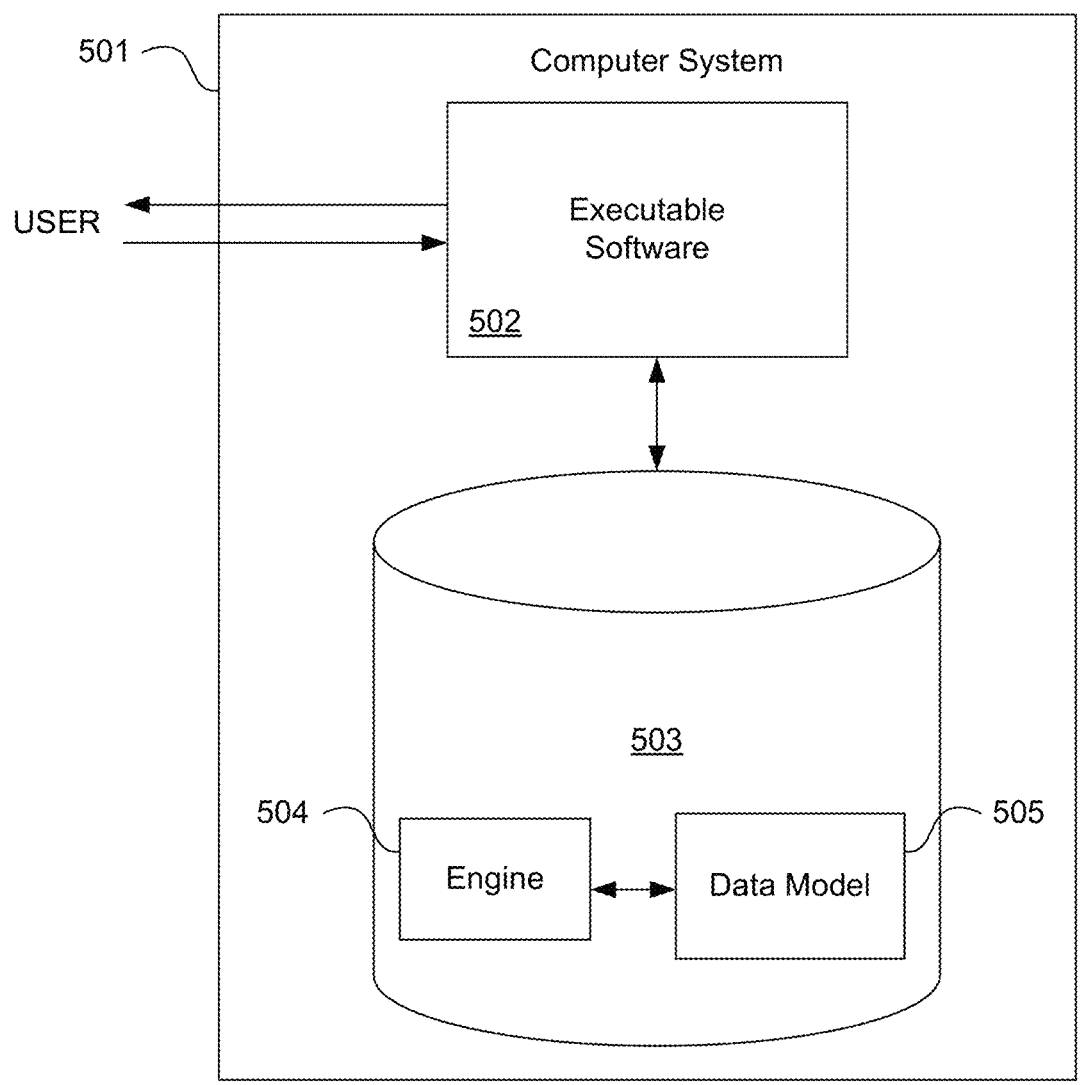
FIG. 5 illustrates hardware of a special purpose computing machine configured to provide contextual suggestion according to an embodiment.

For example, FIG. 5 illustrates hardware of a special purpose computing machine configured to provide context-based suggestion according to an embodiment. In particular, computer system 501 comprises a processor 502 that is in electronic communication with a non-transitory computer-readable storage medium 503. This computer-readable storage medium has stored thereon code 505 corresponding to a data model. Code 504 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 5, the engine is shown as being part of a database. Such an embodiment can correspond to applications performing processing by a powerful engine available as part of an in-memory database (e.g., the HANA in-memory database available from SAP SE of Walldorf, Germany). However, this not required and in certain embodiments (e.g., that shown in FIG. 1) the engine may be implemented in other ways, for example as part of an overlying application layer.

Figure 6:
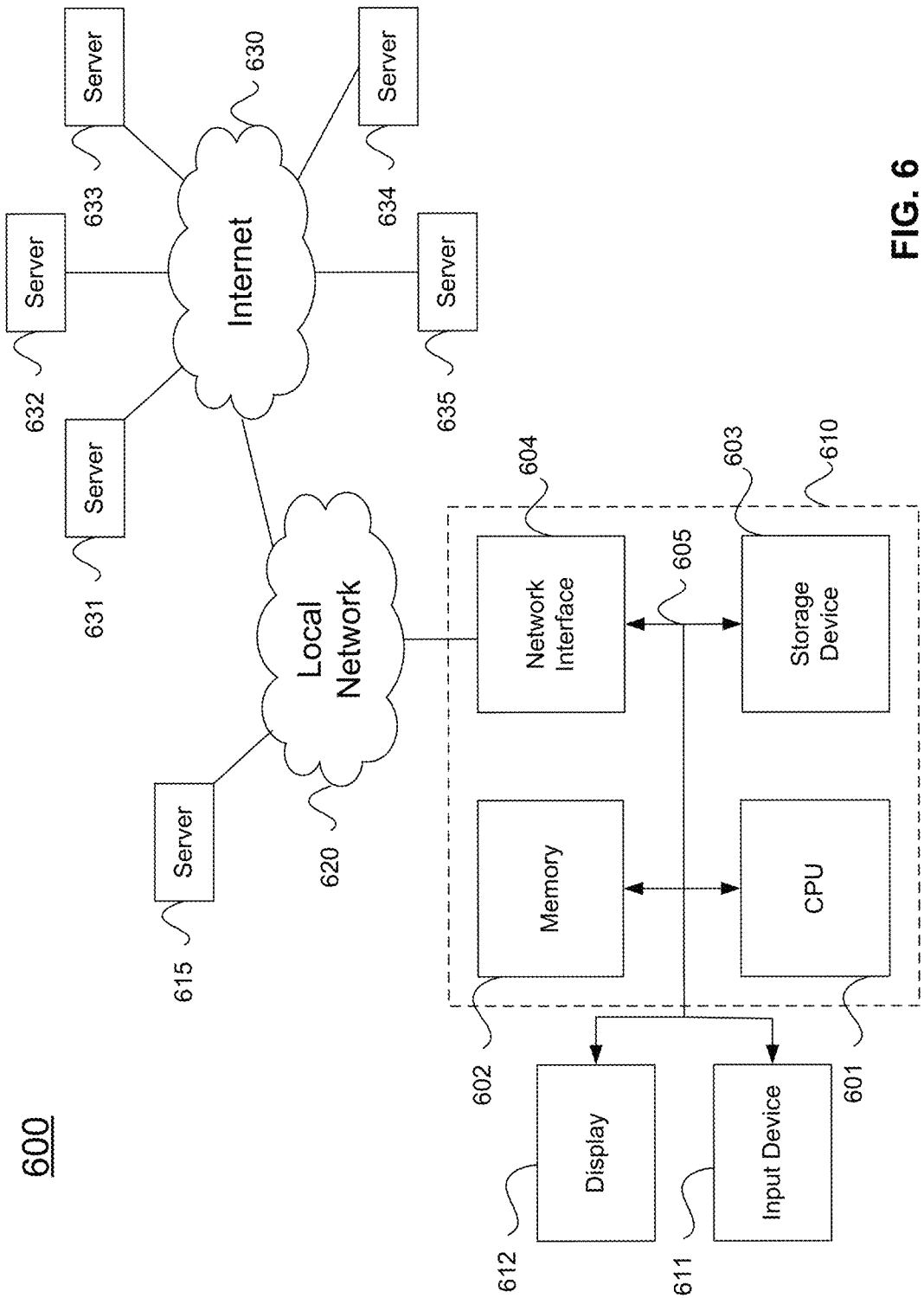
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   an engine receiving input from a user to a cell of a spreadsheet in connection with a workflow, the spreadsheet comprising a first cell type receiving a numerical entry and a second cell type containing a textual header;
   the engine referencing a data model to collect data and metadata relevant to the input, the referencing comprising fetching hierarchical tree information using Representational State Transfer (REST) services;
   the engine parsing the metadata from the data, the metadata comprising a layer of the hierarchical tree information, and the layer comprising a perspective;
   based upon a measure of the perspective in the metadata, the engine generating a first suggestion for entry based upon the first cell type, wherein the engine further considers an access authorization of the user, to generate the first suggestion;
   the engine determining a priority of the first suggestion; and
   the engine communicating the first suggestion to display in the spreadsheet according to the priority.

2. A method as in claim 1 wherein the engine further considers context information to generate the first suggestion.

3. A method as in claim 2 wherein the context information is received from a browser.

4. A method as in claim 1 wherein the context information comprises geolocation.

5. A method as in claim 1 wherein:
   the engine further generates a second suggestion; and
   the engine communicates the first suggestion and the second suggestion for display in a drop down box.

6. A method as in claim 1 wherein the engine is further configured to enter the data into the spreadsheet upon selection of the suggestion.

7. A method as in claim 1 wherein:
   the data model is stored in an in-memory database; and
   the suggestion engine comprises an in-memory database engine.

8. A non-transitory computer readable storage medium embodying a computer program for performing a method, said method comprising:
   an engine receiving input from a user to a cell of a spreadsheet in connection with a workflow, the spreadsheet comprising a first cell type receiving a numerical entry and a second cell type containing a textual header;
   the engine referencing a data model to collect data, additional information, and metadata relevant to the input, wherein the additional information includes an access authorization of the user, and wherein the referencing comprising fetching hierarchical tree information using Representational State Transfer (REST) services;
   the engine parsing the metadata from the data, the metadata comprising a layer of the hierarchical tree information, and the layer comprising a perspective;
   based upon a measure of the perspective, the access authorization, and the first cell type, the engine generating a list of a plurality of suggestions for entry;
   the engine determining respective priorities of the plurality of suggestions; and the engine communicating the plurality of suggestions to display in a drop-down box in the spreadsheet according to the respective priorities.

9. A non-transitory computer readable storage medium as in claim 8 wherein the additional information includes context information.

10. A non-transitory computer readable storage medium as in claim 9 wherein the context information is received from a browser.

11. A computer system comprising:
one or more processors;
a software program, executable on said computer system, the software program configured to cause an engine to:
receive input from a user to a cell of a spreadsheet in connection with a workflow, the cell of a first cell type receiving a numerical entry, the spreadsheet further comprising a second cell type containing a textual header;
reference a data model to collect data and metadata relevant to the input, by fetching hierarchical tree information using Representational State Transfer (REST) services;
parse the metadata from the data, the metadata comprising a layer of the hierarchical tree information, and the layer comprising a perspective;
based upon consideration of a measure of the perspective in the metadata, the first cell type, and another input, generate a list of a plurality of suggestions for entry, wherein the software program is further configured to cause the engine to consider the other input as an access authorization of the user;
determine respective priorities for the plurality of suggestions; and
communicate the plurality of suggestions to display in a drop-down box in the spreadsheet according to the respective priorities.

12. A computer system as in claim 11 wherein the software program is further configured to cause the engine to consider the other input as context information.

13. A computer system as in claim 11 wherein the context information is received from a browser.

14. A computer system as in claim 11 wherein context information comprises geolocation information.

* * * * *